United States Patent [19]
Klaiber

[11] Patent Number: 4,822,306
[45] Date of Patent: Apr. 18, 1989

[54] CONNECTOR BANK FOR TELECOMMUNICATION DEVICES

[75] Inventor: Eberhard Klaiber, Berlin, Fed. Rep. of Germany

[73] Assignee: Krone Aktiengesellschaft, Fed. Rep. of Germany

[21] Appl. No.: 132,988

[22] Filed: Dec. 15, 1987

[30] Foreign Application Priority Data

Dec. 19, 1986 [DE] Fed. Rep. of Germany ....... 3644349

[51] Int. Cl.$^4$ .............................................. H01R 9/24
[52] U.S. Cl. .................................... 439/709; 439/922
[58] Field of Search ..................... 439/43, 49, 54, 709, 439/719, 922; 361/118, 119, 124; 179/325–331

[56] References Cited

U.S. PATENT DOCUMENTS

| | | |
|---|---|---|
| 3,760,328 | 9/1973 | Georgopulos ...................... 439/922 |
| 4,057,692 | 11/1977 | DeBortoli et al. .................... 439/43 |
| 4,118,091 | 11/1978 | Frisby ................................ 439/922 |
| 4,159,500 | 6/1979 | Baumbach et al. ................ 361/124 |
| 4,658,325 | 4/1987 | Splitt ................................. 361/119 |

FOREIGN PATENT DOCUMENTS 3306263 8/1984 Fed. Rep. of Germany .
3415369 11/1985 Fed. Rep. of Germany .
3614592 7/1987 Fed. Rep. of Germany .

*Primary Examiner*—Neil Abrams
*Attorney, Agent, or Firm*—McGlew & Tuttle

[57] ABSTRACT

A connector bank for telecommunication devices is disclosed which includes a plastic housing with at least one series of connection contacts arranged in connection chambers to receive cable wires, in particular dropwire cable wires. A connector bank includes a series of contact elements for overvoltage suppressors formed in plug sockets. A second series of plug contact elements. The test plug sockets are arranged between two adjacent connection chambers for cable wires. By the arrangement according to the invention, the insertion of test plugs into the test plug sockets may be effected with a completely wired connector bank and under the protection of the overvoltage suppressors.

7 Claims, 2 Drawing Sheets

CONNECTOR BANK FOR TELECOMMUNICATION DEVICES

FIELD AND BACKGROUND OF THE INVENTION

This invention relates in general to an apparatus for telecommunication devices and, in particular, to a new and useful connector bank for connecting incoming and outgoing cable wires.

German Pat. No. 34 15 369 teaches a connector bank having two series of accommodation chambers. These accommodation chambers are formed as slot chambers for connection contacts formed as cutting/clamping contacts. A series of plug sockets are arranged between each of the slot chambers. The contact elements are connected electrically conductively with the connection contacts. These plug sockets serve for accommodation of plug contacts of an overvoltage suppressor. For testing the completely wired connector bank according to German Pat. No. 34 15 369, the overvoltage suppressor magazine has to be pulled out from the plug sockets. The overvoltage suppressor magazine must be pulled out so that the test plugs ma be plugged in to the test plug sockets. This well known connector bank has the disadvantage that a test of the completely wired connector bank is only possible without overvoltage protection. Additionally, it is a disadvantage that the plugged-on overvoltage suppressor magazine appreciably increases the constructional height of the connector bank. According to this arrangement, a greater space is required when mounting the connector bank in a housing, e.g. a terminal block is required.

German Pat. No. 33 06 263 teaches another connector bank for elecommunication devices having two series of connection chambers for the connection contacts of the cable wires. A chamber opening towards the top of the connector bank is provided for accommodation of the overvoltage suppressor magazine. By this arrangement, a constructional height of the connector bank with plugged-in overvoltage suppressor magazine is reduced considerably. Unfortunately, testing of the completely wired connector bank is only possible after removing the overvoltage suppressor magazine (pulling the overvoltage suppressor magazine out).

German Pat. No. 36 14 952 teaches a connector bank in which incoming cable wires are connected rigidly to the cutting/clamping contacts which are each arranged in slot chambers of a plastic housing. The outgoing cable wires are connected to cutting/clamping contacts of plugs, each plug being inserted into a plug chamber of the plastic housing. The plug contacts can be plugged-in into plug sockets in the bottom of the plug chambers. The plug sockets in the bottom of the plug chambers which receive the plugs of the outgoing cable wires also serve for a plug chamber for plugging in the test plugs into the connector bank. By this arrangement, to plug the test plug in, the plugs of the outgoing cable wires must first be removed from the connector bank. With this connector bank, it is not possible, to perform a test with complete wiring, although within the plastic housing, accommodation chambers for overvoltage suppressors are formed, being conductively connected over contact elements with the connecting contacts of the cable wires.

SUMMARY AND OBJECT OF THE INVENTION

It is an object of the present invention to provide a connector bank for telecommunication applications, which allows the insertion of test plugs for a double wire into the plug sockets with connected incoming and outgoing cable wires under simultaneous protection by the overvoltage suppressors, the constructional volume of the connector bank being as small as possible.

The connector bank according to the invention includes an overvoltage suppressor connected with a first series of contact elements formed in plug sockets. Further, at least one additional, second series of plug sockets is provided with contact elements for the test plugs in the plastic housing outside the space required for the overvoltage suppressors. These additional plug sockets can either be connected directly adjacent to the overvoltage suppressors being plugged-in into the respective plug sockets, or in particular useful manner between the adjacent connection chambers each for the connection contacts of the cable wires, in particular dropwire cable wires. The connector bank according to the invention allowing the insertion of test plugs for test purposes with simultaneously completely connected incoming and outgoing cable wires and with simultaneous protection of the cable wires by the overvoltage suppressors.

The overvoltage suppressors according to the invention can be accommodated in an overvoltage suppressor magazine plugged-in with its plug contacts into the series of plug sockets provided with contact elements for this purpose. According to the invention, it is further provided that in the plastic housing itself, accommodation chambers for the overvoltage suppressors are provided, the accommodation chambers being conductively connected over associated contact elements with the respective connection contacts. In either case, neither the overvoltage suppressors have to be removed from the plastic housing for electrical testing, nor must the cable wires be pulled out from the connection contacts, in particular cutting/clamping contacts, such that the connector bank can be tested with connected incoming and outgoing cable wires and in a condition protected by the overvoltage suppressors.

It is another object of the invention to provide a connector bank for telecommunication devices having a plastic housing with a series of connection contacts for cable wires positioned in connection chambers defined by the housing. A series of contact elements are preferably positioned in overvoltage plug sockets defined in the plastic housing. Each of the overvoltage plug sockets and the contact elements are adapted to receive an overvoltage suppressor. A series of test plug sockets are provided outside of the space required for the overvoltage suppressor, each plug socket is provided with contact elements adapted to engage a test plug received by the test plug socket. Preferably, each connection contact of the series of connection contacts is formed integral with two contact elements, a first contact element adapted to engage into a first adjacent test plug socket and a second contact element adapted to engage into a second test plug socket. Each of the connection contacts of the series of connection contacts is also formed integral with an overvoltage contact element positioned in an overvoltage plug socket. The overvoltage suppressors are bridged by an earthing rail which may be snapped in the plastic housing. The arrangement and interconnection of contacts allows the insertion of test plugs for test purposes while the incoming and outgoing cable wires are completely connected and while the protection of the cables by the overvoltage suppressors is activated.

The various features of novelty which characterize the invention ar pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 2:
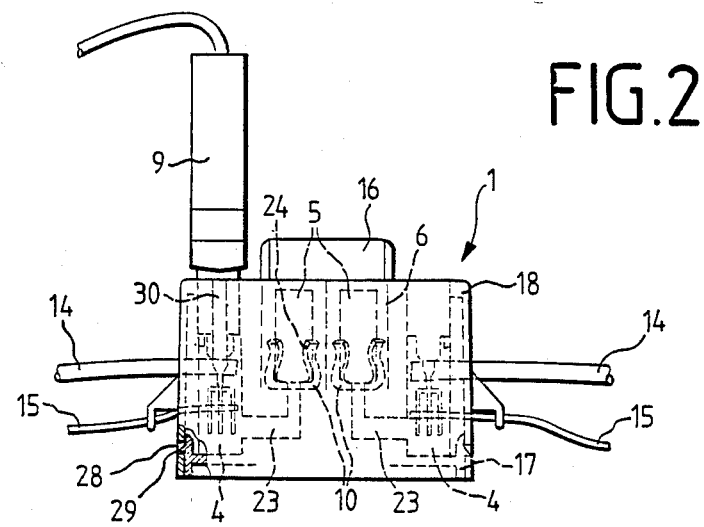
FIG. 2 is a cross sectional view taken along line II—II in FIG. 1.
Figure 1:
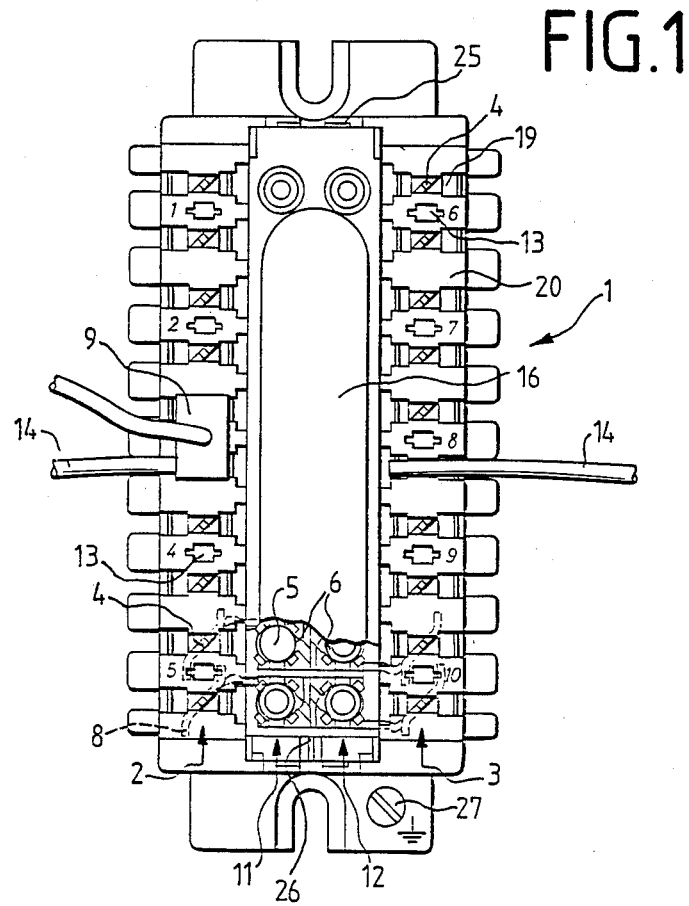
FIG. 1 is a partial sectional simplified top view of the device according to the present invention.

Referring to the drawings in particular, the invention embodied therein as shown in FIGS. 1 and 2, comprises a connector bank apparatus for telecommunication devices, which includes a plastic housing generally designated 1; a series of connection contacts 4 positioned in connection chambers defined by the housing A series of overvoltage contact elements 10 are positioned in overvoltage plug sockets which are defined in a central area for accommodation area 6. The overvoltage plug sockets and overvoltage contact elements are adapted to receive an overvoltage suppressor 5. A series of test plug sockets 13 are provided outside of the space required for the overvoltage suppressors 5. Each of the plug sockets is provided with contact elements 8 connected with adjacent connection contacts 4.

The plastic body includes a lower and an upper housing part 17,18. Housing parts 17 and 18 are latched with each other by latch openings 29 provided at the upper housing part 17 and by latch hooks 28 provided at the lower housing part 17. The upper housing part 18 has two series 2,3 of slot chambers 19 being open toward the top and being separated by walls 20.

Between the two slot chambers 19 arranged at the longitudinal sides of the connector bank, two series 11, 12 of square accommodation chambers 6 are provided serving for accommodation of overvoltage suppressors 5. In the walls 20 of two adjacent slot chambers 19, plug sockets 13 are disposed, the inner shape of which corresponds to the plug-in part 30 of a test plug 9.

In each slot chamber 19 of the two series 2, 3 cutting/clamping contacts 4 formed of a spring-type, metal, electrically conductive material are accommodated. The cutting/clamping contacts 4 exhibit a contact slot 21, being above a U-shaped cross slot 22 crossing the contact slot 21 wider than below the U-shaped cross slot 22.

In each contact slot 21 of each cutting/clamping contact 4, a thin standard cable 15 and a thick dropwire cable 14 can be connected.

Figure 4:
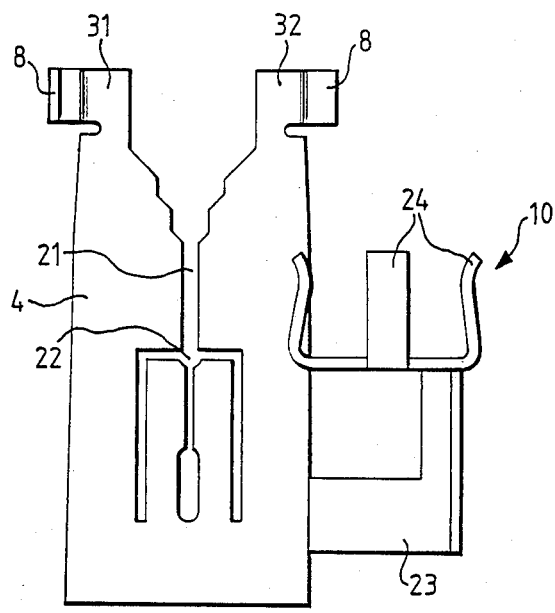
Figure 3:
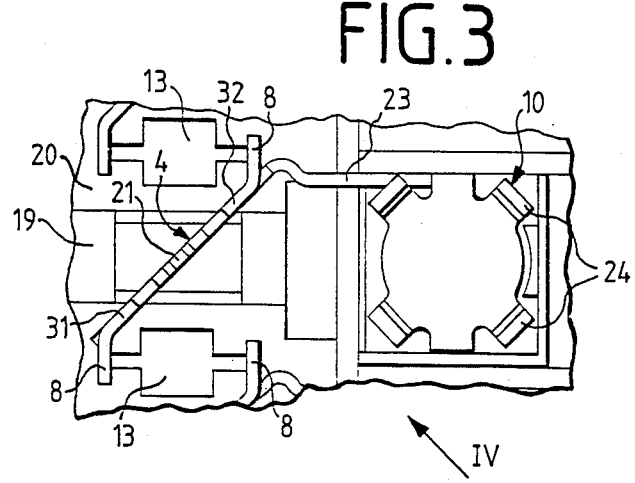
FIG. 3 is a top view of a cutting/clamping contact with connection contact for an overvoltage suppressor according to the invention; and, FIG. 4 is a side view of the connection element shown in FIG. 3.

As shown in FIGS. 3 and 4, a plug contact shaped like a crown contact 10 is rigidly connected over an extension piece 23 with each cutting/clamping contact 4 to form a connected contact element. The teeth 24 of said crown contact extending upward into the associated accommodation chamber 6.

Furthermore, each cutting/clamping, contact 4 exhibits outside a bent pick-up contact 8 at each end of the two legs 31, 32 forming the slot 21. Contact 8 extends out of the slot chamber 19 of the upper housing part, into which the cutting/clamping contact 4 is inserted under an angle of 45° with respect to the wire axis, into a plug socket 13 being formed in a wall 20.

Above the accommodation chambers 6 for the overvoltage suppressors 5, a metal earthing rail 16 is provided, being connected on the front side of the plastic housing 1 with a swiveling device 25 and being latchable o the other front side of the plastic housing over a snap-in device 26 with the plastic housing. The overvoltage suppressors 5 inserted into the accommodation chambers 6 are, thus, contacted from below by the crown contacts 10 and from above by the earthing rail 16.

The earthing rail 16 is connected electrically with an earthing terminal 27 of the connector bank. In case of an overvoltage, the overcurrent flowing over the cable wires 14, 15 flows, thus, over the cutting/clamping contact 4 and the crown contact 10 through the overvoltage suppressor 5 to the earthing rail 16 to the earthing terminal 27.

With a connector bank secured by the overvoltage suppressors 5, test plugs 9 can be inserted into the respective plug sockets 13 for electrical testing of the cable wires 14,15, whereby a connection to two cutting and clamping contacts 4 of a double wire 14, 15 is effected.

While a specific embodiment of the invention has been shown an described in detail to illustrate the application of the principles of the invention, it will be understood that the invention may be embodied otherwise without departing from such principles.

What is claimed is:

1. A connector bank for telecommunication devices comprising: a plastic housing; a series of connection contacts for cable wires positioned in connection chambers defined by said housing; a series of overvoltage suppressor contact elements positioned in overvoltage plug sockets defined in said housing, said overvoltage plug sockets and said overvoltage suppressor contact elements adapted to receive an overvoltage suppressor at an overvoltage suppressor space; and, a series of test plug sockets, each test plug socket being positioned between two adjacent connection chambers associated with said series of connection contacts, each plug socket being provided with pickup contact elements adapted to engage a test plug received by the test plug socket said pickup contact elements being connected with a connection contact of said series of connection contacts, each of said test plug sockets of said series of test plug sockets being positioned between two adjacent connection contacts such that one pickup contact of each of the two adjacent connection contacts enters into a single test plug socket of said series of test plug sockets.

2. A connector bank according to claim 1, wherein: said overvoltage plug sockets are formed as accommodation chambers molded in said plastic housing.

3. A connector bank according to claim 2, wherein: said accommodation chambers for the overvoltage suppressors are formed between two series of connection chambers formed in the plastic housing.

4. A connector bank according to claim 1, wherein: said contact elements of said series of contact elements positioned in overvoltage plug sockets are spring-type elements arranged in the accommodation chambers for the overvoltage suppressor.

5. A connector bank according to claim 1, wherein: said overvoltage plug sockets are formed as accommodation chambers molded in the plastic housing, the accommodation chambers being bridged by an earthing rail which may be snapped in on the plastic housing.

6. A connector bank for telecommunication devices comprising: a plastic housing having a top portion and a side portion, said housing defining an accommodation chamber in the housing top portion, a series of connection chambers in said housing side portion and a series of test plug sockets in said housing top portion adjacent said accommodation chamber, each of said test plug sockets being positioned between adjacent connection chambers of said series of connection chambers; a series of contact elements each including a cutting/clamping connection contact positioned in a connection chamber, an overvoltage contact element positioned in said accommodation chamber, each of said overvoltage contact elements being connected to a cutting/clamping connection contact of a corresponding one of said series of contact elements, each of said overvoltage contact elements in said series of contact elements being adapted to receive an overvoltage suppressor and first and second test plug contact elements connected to opposite sides of each of said cutting/clamping contacts of each of said series of contact elements, each of said test plug sockets of said series of test plugs sockets being positioned between two adjacent cutting/clamping connection contacts such that one test plug contact element of each two adjacent cutting/clamping connection contact enters into a single test plug socket of said series of test plug sockets thereby allowing the insertion of a test plug into one of said test plug sockets of said series of test plug sockets with connected incoming and outgoing cable wires under simultaneous protection by a corresponding overvoltage suppressor.

7. A connector bank according to claim 6, wherein: said accommodation chambers are bridged by an earthing rail to be snapped in on the plastic housing.

* * * * *